J. PIONTKOWSKI.
TIRE STRUCTURE.
APPLICATION FILED AUG. 31, 1914.
1,152,657.
Patented Sept. 7, 1915.
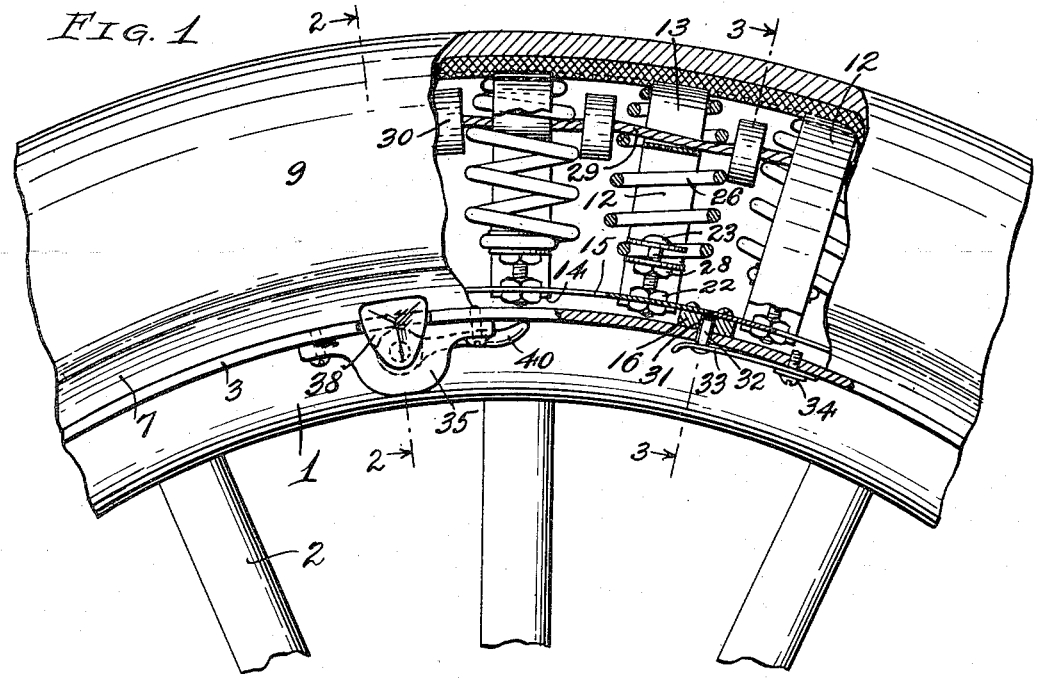
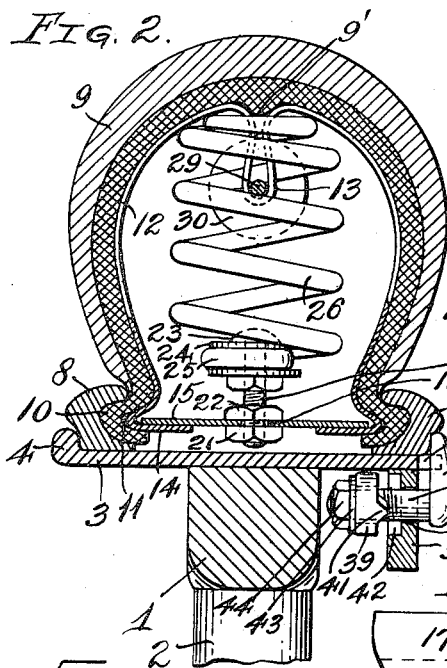
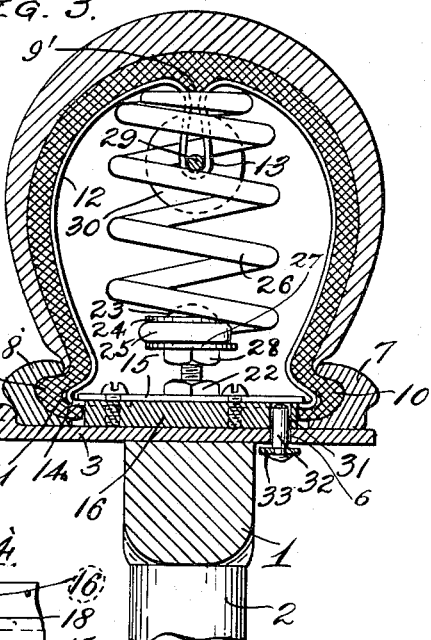
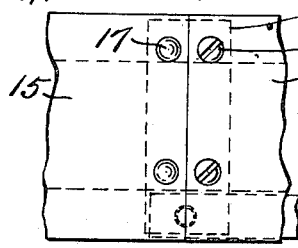
Witnesses:
A. L. Lord
C. N. Tresch
Inventor.
John Piontkowski
by B. W. Brockett
Att'y.

UNITED STATES PATENT OFFICE.

JOHN PIONTKOWSKI, OF CLEVELAND, OHIO, ASSIGNOR OF THREE-EIGHTHS TO STEPHEN WASIELEWSKI, ONE-EIGHTH TO JOHN YABLONOWSKI, AND ONE-EIGHTH TO MARTIN GRAYEK.

TIRE STRUCTURE.

1,152,657.     Specification of Letters Patent.     Patented Sept. 7, 1915.

Application filed August 31, 1914. Serial No. 859,507.

*To all whom it may concern:*

Be it known that I, JOHN PIONTKOWSKI, residing at Cleveland, in the county of Cuyahoga and State of Ohio, have invented certain new and useful Improvements in Tire Structures, of which the following is a specification.

This invention relates generally to vehicle tires, and particularly to spring tire structures.

More specifically the invention relates to spring tire structures comprising a metal rim secured to the felly and having a peripherally extending bead at one edge against which the clencher rings and the tire structure are forced by suitable clamps secured to the opposite edge of the rim, the tire structure comprising a flexible casing having clencher beads for engagement by the clencher rings adapted to be held apart and in the grooves by a metal band supporting springs which engage loops formed in flat spring members which are provided with hooks extending over the edges of the band arranged between it and the walls of recesses formed in the beads.

The invention may be further briefly summarized as consisting in the construction and combination of parts hereinafter set forth in the following description, drawings and claims.

Referring to the drawings, Figure 1 is a portion of a rim and tire structure with parts broken away and in section; Fig. 2 is a section upon the line 2—2 of Fig. 1; Fig. 3 is a section upon the line 3—3; and Fig. 4 is a bottom plan view of the connection of the parts of the spreader band.

In carrying out the invention any preferred form and construction of parts may be employed, so long as they possess the necessary characteristics, but I have shown one arrangement which is effective, and in such embodiment 1 represents the felly connected to the spokes 2 in the usual manner. Secured to the felly is a metal rim 3 having a peripherally extending bead 4 on one edge and notches 5 on the opposite edge. Openings 6 are arranged in the rim 3 on the same side of the felly as the notches 5 for a purpose to be described. This rim 3 is adapted to receive the usual clencher rings 7 and 8 and it is between these clencher rings that the tire structure is mounted.

The tire structure comprises an outer casing 9 conforming generally to the usual casing and having beads 10 at its inner edges, each bead being formed with an inwardly opening annular recess 11, as shown. This casing is also provided internally at the tread with an annular bead 9'. Mounted within the casing is a plurality of leaf spring members 12, each having at a point corresponding to the tread an inwardly extending loop 13, for a purpose to be described. This loop is formed by bending the metal back upon itself, as shown, and the rounded corners at the tread engage on either side of the bead 9'. The lower ends are provided with hook portions 14 adapted to nest into the groove 11 and to receive in them the edges of a spring supporting band 15 made up of a plurality of pieces, preferably three in number, with their ends abutting. These pieces are held in place by metal cleats 16 at the abutting points, one band portion being secured to the cleat by rivets 17 and the adjacent portion being secured to the cleat by screws 18. This band is provided throughout its circumference with openings 19 arranged in alinement with the felly and each adapted to receive a bolt shank 20 which is held in any adjusted position by nuts 21 and 22. The head 23 of this bolt engages a washer 24 arranged above a convolution 25 of a spring 26 and this convolution 25 is held in place by a washer 27 and nut 28. The upper end of this spring receives the loop 13 of one of the spring members 12. In order to prevent the springs from working toward each other, a cable 29 is threaded peripherally through the springs, and upon this cable are suitable washers 30 which hold the springs apart near the periphery of the wheel.

In order to hold the band 15 against movement around the rim 3, each of the cleats 16 is provided with an opening 31, and each opening is engaged by a pin 32 carried by a leaf spring 33 arranged on the underside of the rim 3 and held in place by a suitable screw 34. The pins 32 project through the openings 6 into the openings 31 in the cleats 16 and prevent the creeping of the band 15 around the felly.

In order to clamp the two clencher rings 7 and 8 toward the beads of the tire structure, I provide at intervals around the wheel, suitable clamping devices and there is one of these devices for each of the recesses 5 and each of these devices consists of a supporting block 35 secured to the underside of the rim 3 and having an opening 36 therethrough for the reception of a threaded shank 37, on the outer end of which is a clamping member 38 adapted when in proper position to pass into the corresponding recess 5 and engage the clencher ring 8. The threaded shank 37 receives a cam member 39 provided with a handle 40 and this cam member is provided with diametrically opposed cam teeth 41 adapted when in the proper position to engage a corresponding recess 42 in the block 35. This cam member is held in place by a suitable washer 43 and nut 44.

In practice the inner spring structure is built up in place within the casing, and the casing of this structure is slipped onto the rim. The outer clencher ring 8 is then placed in position and the clamps 38 are moved in alinement with the recesses 4, when the handles 40 may be pushed toward the rim, and the teeth 41 will engage the block and will cause the clamping members to force the outside clencher ring in toward the tire structure holding it in place.

Having described my invention, I claim:—

1. In a tire structure, a rim, clencher rings upon said rim, a tire arranged between said clencher rings and comprising a flexible casing having beads for engaging said rings and internal annular recesses within said beads, a plurality of casing supporting spring members each having an inwardly extending loop near the tread and hooked inner ends engaging the recesses in the beads, a band engaging within said hooked portion, a plurality of springs each engaging the loop of one of the supporting spring members at the outer end, adjustable connecting means between each spring and the band, means for adjustably securing the springs at the inner ends to the band, and means for clamping said rings upon the tire structure.

2. In a tire structure, a rim, clencher rings upon said rim, a tire arranged between said clencher rings and comprising a flexible casing having beads for engaging said rings, and internal annular recesses within said beads, a plurality of supporting spring members conforming to the interior of the casing and having an inwardly extending loop near the tread, and hooked inner ends engaging in the recesses of the beads, a band having its edges engaging within said hooked portions, a plurality of coiled springs, each engaging the loop of one of the supporting spring members at one end, a threaded shank connected to the opposite end of each spring, means for securing said threaded shank in any adjusted position in such band, and means for clamping said rings upon the tire structure.

In testimony whereof I affix my signature in presence of two witnesses.

JOHN PIONTKOWSKI.

Witnesses:
GUY O. FARQUHARSON,
C. H. TRESCH.

Copies of this patent may be obtained for five cents each, by addressing the "Commissioner of Patents, Washington, D. C."